(12) United States Patent
Jung

(10) Patent No.: US 8,051,603 B1
(45) Date of Patent: Nov. 8, 2011

(54) WATER WING PLANT POT

(76) Inventor: Man-Young Jung, Pasadena, CA (US)

( * ) Notice: Subject to any disclaimer, the term of this patent is extended or adjusted under 35 U.S.C. 154(b) by 0 days.

(21) Appl. No.: 12/792,217

(22) Filed: Jun. 2, 2010

(51) Int. Cl.
*A01G 9/02* (2006.01)

(52) U.S. Cl. .................. 47/66.1; 47/79; 47/85

(58) Field of Classification Search .......... 47/66.1, 47/66.5, 79, 82, 85, 87, 66.6, 80, 86; 119/248; 220/510, 529, 532
See application file for complete search history.

(56) References Cited

U.S. PATENT DOCUMENTS

| 267,296 | A | | 11/1882 | Wilder | |
|---|---|---|---|---|---|
| 3,783,555 | A | | 1/1974 | Peters | |
| 3,958,366 | A | | 5/1976 | Meyers | |
| 4,265,050 | A | | 5/1981 | Buescher | |
| 4,323,032 | A | * | 4/1982 | Halfon | 119/248 |
| 4,329,814 | A | | 5/1982 | Blicha | |
| 5,044,118 | A | * | 9/1991 | Ferris | 47/62 R |
| 5,189,835 | A | | 3/1993 | Green | |
| 5,446,994 | A | | 9/1995 | Chou | |
| 5,511,342 | A | * | 4/1996 | Maso | 47/83 |
| 6,070,359 | A | | 6/2000 | Liu | |
| 6,729,070 | B1 | * | 5/2004 | Locke et al. | 47/79 |

FOREIGN PATENT DOCUMENTS

GB 2400119 A * 10/2004

* cited by examiner

*Primary Examiner* — Rob Swiatek
*Assistant Examiner* — Lisa Tsang
(74) *Attorney, Agent, or Firm* — Clement Cheng

(57) ABSTRACT

A plant pot has a main central portion having an opening providing access to a main planting area, and a pair of wings extending from the main central portion, namely a left wing and a right wing; and a pair of dividers, namely a left divider and a right divider. The pair of dividers is inserted between the pair of wings and the main central portion. The pair of dividers is formed as sheets, and the pair of dividers is removable from a divider attachment area. A plurality of water openings are disposed on the pair of dividers, and the plurality of water openings allow water to pass between the main central portion and the pair of wings.

14 Claims, 7 Drawing Sheets

WATER WING PLANT POT

FIELD OF THE INVENTION

The present invention is in the field of water saving plant pots having water wings.

DISCUSSION OF RELATED ART

A variety of water saving plant pots have been used for maintaining water in a plant pot and for saving water. For example, in U.S. Pat. No. 3,783,555 to Peters, issued Jan. 8, 1974, the disclosure of which is incorporated herein by reference, a self-watering flower pot has a water-receiving chamber between the outer and inner receptacle, allowing a small amount of water flow depending on soil dryness. A device containing perforated walls allows the prevention of mold as shown in U.S. Pat. No. 3,958,366 to Meyers, issued May 25, 1976, the disclosure of which is incorporated herein by reference.

For example, in U.S. Pat. No. 267,296 to Wilder, issued Nov. 7, 1882, the disclosure of which is incorporated herein by reference, the self irrigating flower pot contains a vessel to automatically apply the proper degree of moisture from a connected reservoir. A device with a replenishable reservoir for humidifying the immediate vicinity of the plant includes an inner container member with a perforated surface portion as shown in U.S. Pat. No. 4,265,050 to Buescher, issued May 5, 1981, the disclosure of which is incorporated herein by reference.

A water-saving flower pot comprises a device which traps water between sidewalls of the pot so that the soil within the pot remains moist for prolonged periods of time, as shown in U.S. Pat. No. 4,329,814 to Blicha, issued May 18, 1982, the disclosure of which is incorporated herein by reference. For example, in United States parent number 5,189,835 to Green, issued Mar. 2, 1993, the disclosure of which is incorporated herein by reference, an apparatus controlling the amount of water supplied to the plant includes a capillary sheet panel and support block.

Also for example, in U.S. Pat. No. 5,446,994 to Chou, issued Sep. 6, 1995, the disclosure of which is incorporated herein by reference, a flower pot contains a water supply regulator which guides water into the pot body by capillary action. A flower pot structure with a natural water supply system includes a pot body, main water storage region, a central soil region, and a water supply device as shown in U.S. Pat. No. 6,070,359 to Liu, issued Jun. 6, 2000, the disclosure of which is incorporated herein by reference.

Unfortunately, the plant pot constructions in the art are complex and difficult to manufacture.

SUMMARY OF THE INVENTION

A plant pot has a main central portion having an opening providing access to a main planting area, and a pair of wings extending from the main central portion, namely a left wing and a right wing; and a pair of dividers, namely a left divider and a right divider. The pair of dividers is inserted between the pair of wings and the main central portion. The pair of dividers is formed as sheets, and the pair of dividers is removable from a divider attachment area. A plurality of water openings are disposed on the pair of dividers, and the plurality of water openings allow water to pass between the main central portion and the pair of wings.

Optionally, a wing upper joint is formed at a junction between one of the pair of wings and the main central portion. The main central portion is formed with a main wall that meets a wing wall at an angle. A wing lower joint is also formed at a junction between one of the pair of wings and the main central portion. The wing lower joint joining extends from a lower portion of the main central portion to the wing upper joint at an upper portion of the main central portion. The wings have a pair of wingtips, and each wingtip is formed on each of the pair of wings extending from the main central portion.

A wing side rim is optionally formed on each of the pair of wings. A bowl rim optionally has about the same height as the wing side rim. A wing side rim is optionally formed on each of the pair of wings. A bowl rim has a higher height than the wing side rim. The plant pot optionally has a pair of hooks formed on the left divider or on the right divider. The plant pot optionally includes a plurality of small tubes, and each of the plurality of small tubes terminate at one of the plurality of water openings. The plant pot has a first pair of free tips formed at the left wing, and a second pair of free tips formed at the right wing.

The plant pot optionally has a first pair of notches formed on the left divider; and a second pair of notches formed on the right divider, wherein the first pair of notches and the second pair of notches removably attach to the main central portion. The first pair of notches formed on the left divider is formed at a divider upper edge, and the second pair of notches formed on the right divider is formed at the divider upper edge.

The plant pot optionally has a plurality of small tubes, where each of the plurality of small tubes may terminate at one of the plurality of water openings. The plant pot optionally has a plurality of tube walls that extend at an angle from the pair of dividers. The plurality of small tubes may have a plurality of tube walls.

The plant pot may have a long wall and a short wall, so that the plant pot is asymmetrical at the main central portion.

Figure 1:
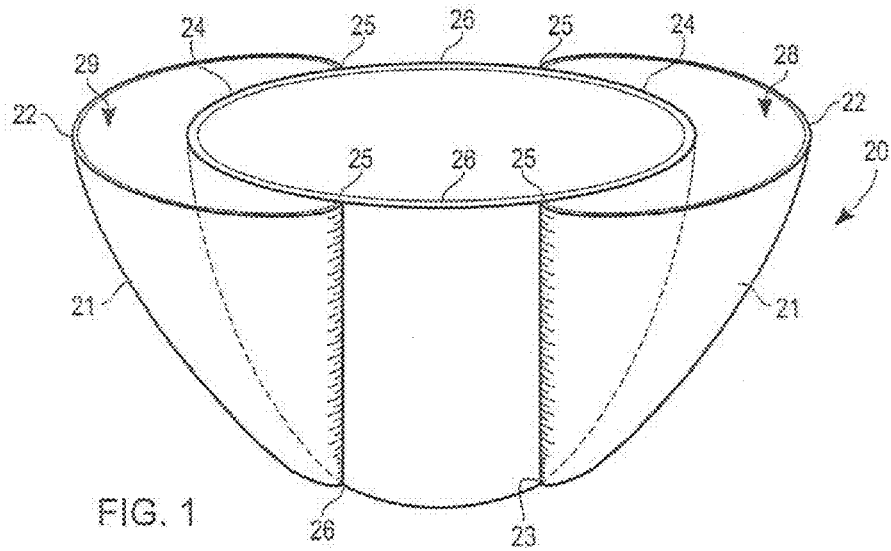
FIG. 1 is a diagram of a low pot having a low central portion and pair of low wing members.

The following call a list of elements can be a useful guide in understanding the invention:

20 Pot
21 Wing With Face
22 Wingtip
23 Lower Wing Joint
24 Wing Side Rim
25 Wing Upper Joint
26 Bowl Rim 28 Right-Wing Opening
29 Left Wing Opening
30 Bowl Opening
31 Hook
32 Tube
33 Divider Edge
35 Divider
36 Free Tips
38 Notch
42 Water Opening
43 Divider Upper Edge
44 Tube Wall
52 Short Wall
53 Long Wall

DETAILED DESCRIPTION

The present invention is a pot 20 that has a pair of wing members. Preferably, a left wing and a right wing provide supplemental volume to a central bowl portion. The central portion can be made as a ceramic pot of the same dimensions as a regular ceramic pot such as a flower pot. The traditional flowerpot is depicted as the central portion of the present invention.

A pot 20 has a pair of wings 21 have an upwardly sloping face. Each wing terminates in a wing tip 22. The wing is connected to the pot 20 at a lower wing joint 23 which extends from a lower portion of the pot 20 and upper portion of the pot up to an upper wing joint 25. The wing side rim 24 retains soil and is between a bowl opening 30 and though wing tip 22. A right wing opening 28 is located on the right side between the wing side rim 24 and the wing tip 22. A left wing opening 29 is located on the left side between the wing side rim 24 and the wing tip 22.

Figure 2:
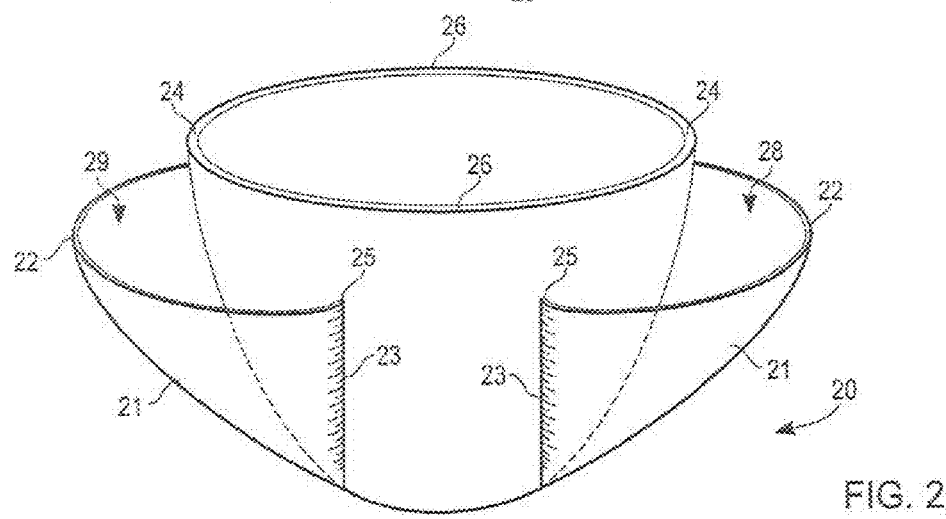
FIG. 2 is a diagram of a low pot having a low central portion and a pair of low wing members that are lower than the central portion.
Figure 3:
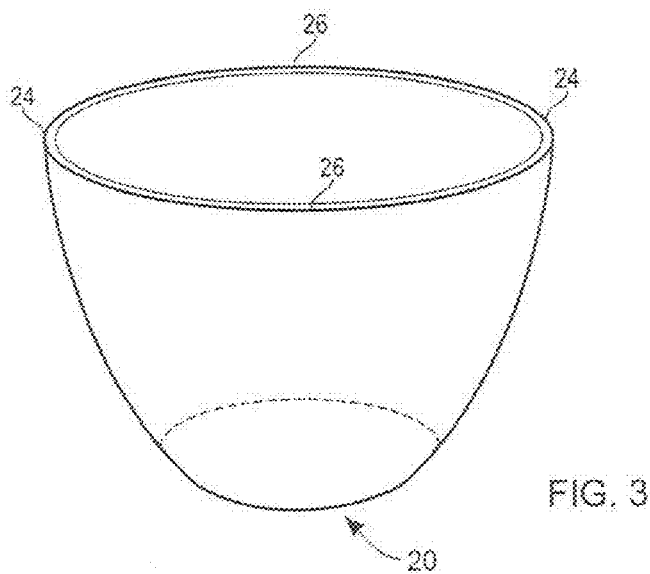
FIG. 3 is a diagram of the same pot without the wing members with only the central portion.
Figure 4:
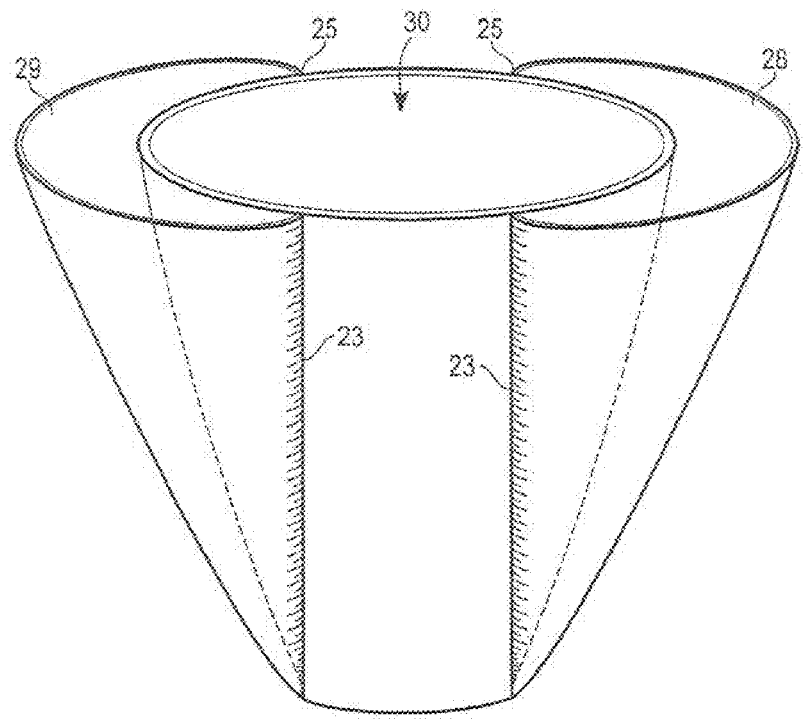
FIG. 4 is a diagram of a tall pot having a pair of tall wing members.

The configurations of the central portion and the wing portions can be varied for different types of plants and for different heights. FIG. 1 is a diagram of a low pot having a low central portion and pair of low wing members. FIG. 2 is a diagram of a low pot having a low central portion and a pair of low wing members that are lower than the central portion. FIG. 3 is a diagram of the same pot without the wing members with only the central portion. FIG. 4 is a diagram of a tall pot having a pair of tall wing members.

Figure 5:
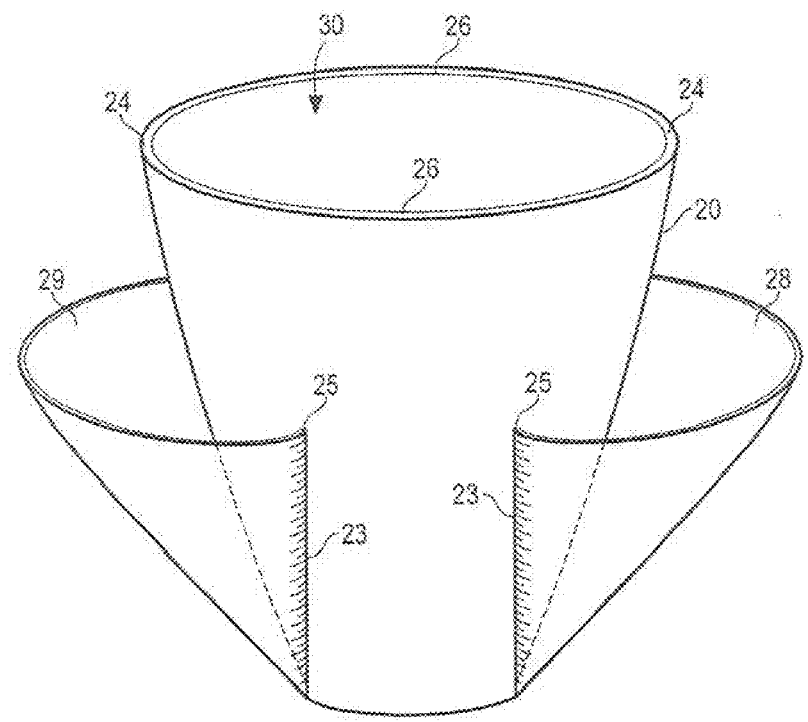
FIG. 5 is a diagram of a tall pot coming a pair of low wing members that are lower than the tall pot.

FIG. 5 is a diagram of a tall pot coming a pair of low wing members that are lower than the tall pot.

Figure 6:
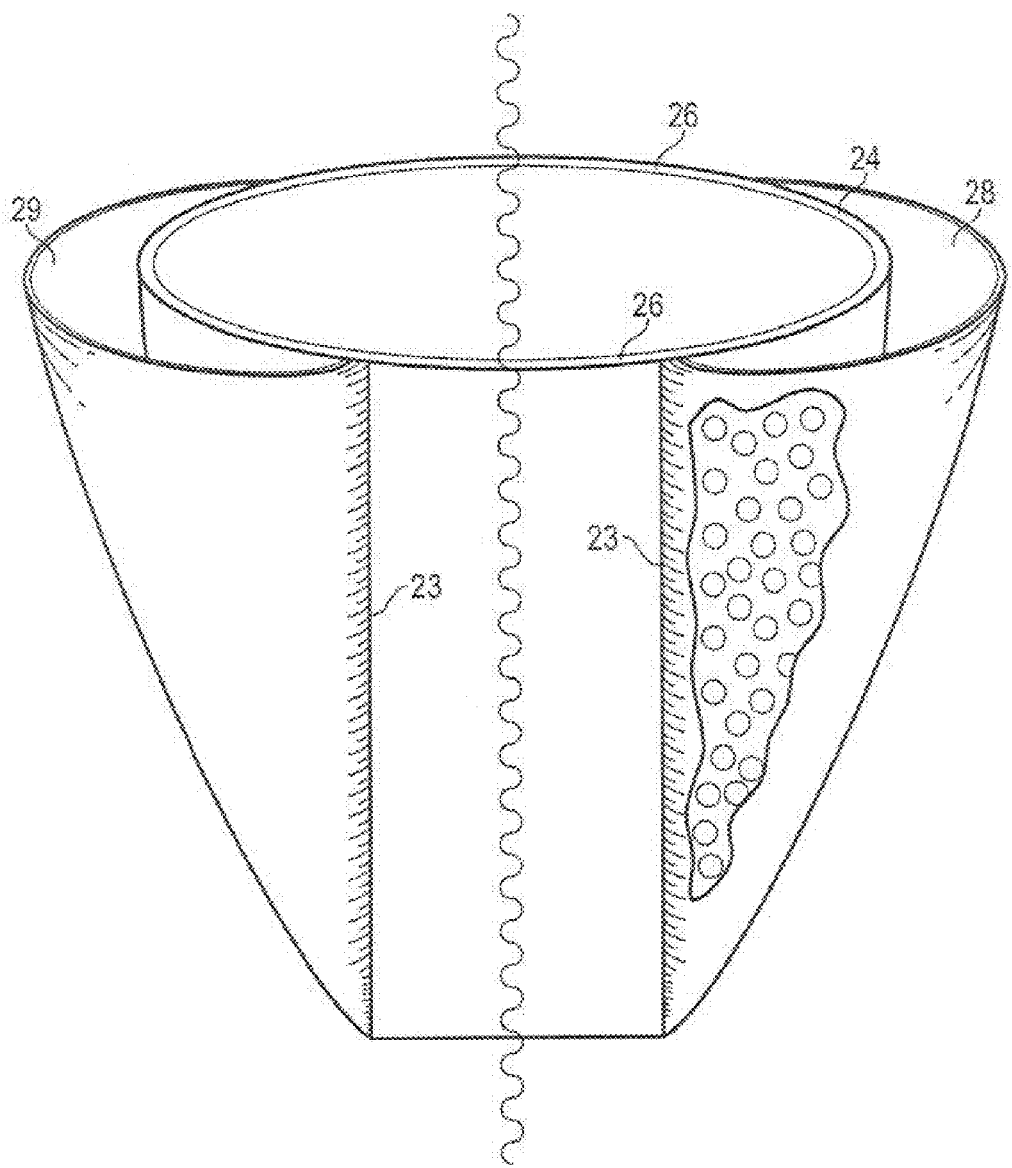
FIG. 6 is a broken view of the unitary construction showing water openings located on the central portion inside the wing.
Figure 7:
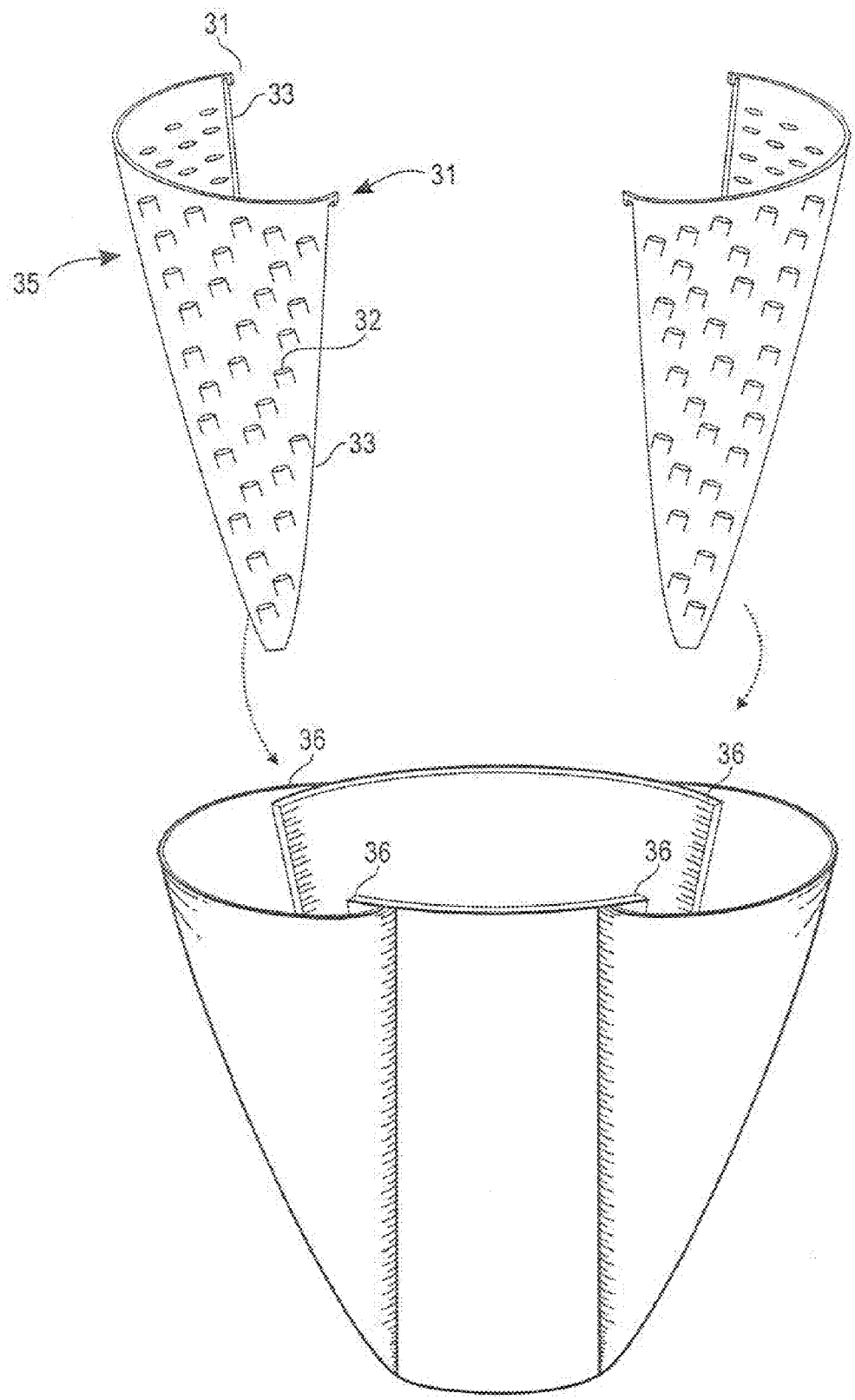
FIG. 7 is an assembly diagram of the present invention where the central portion is made with a pair of dividers that are removable.
Figure 8:
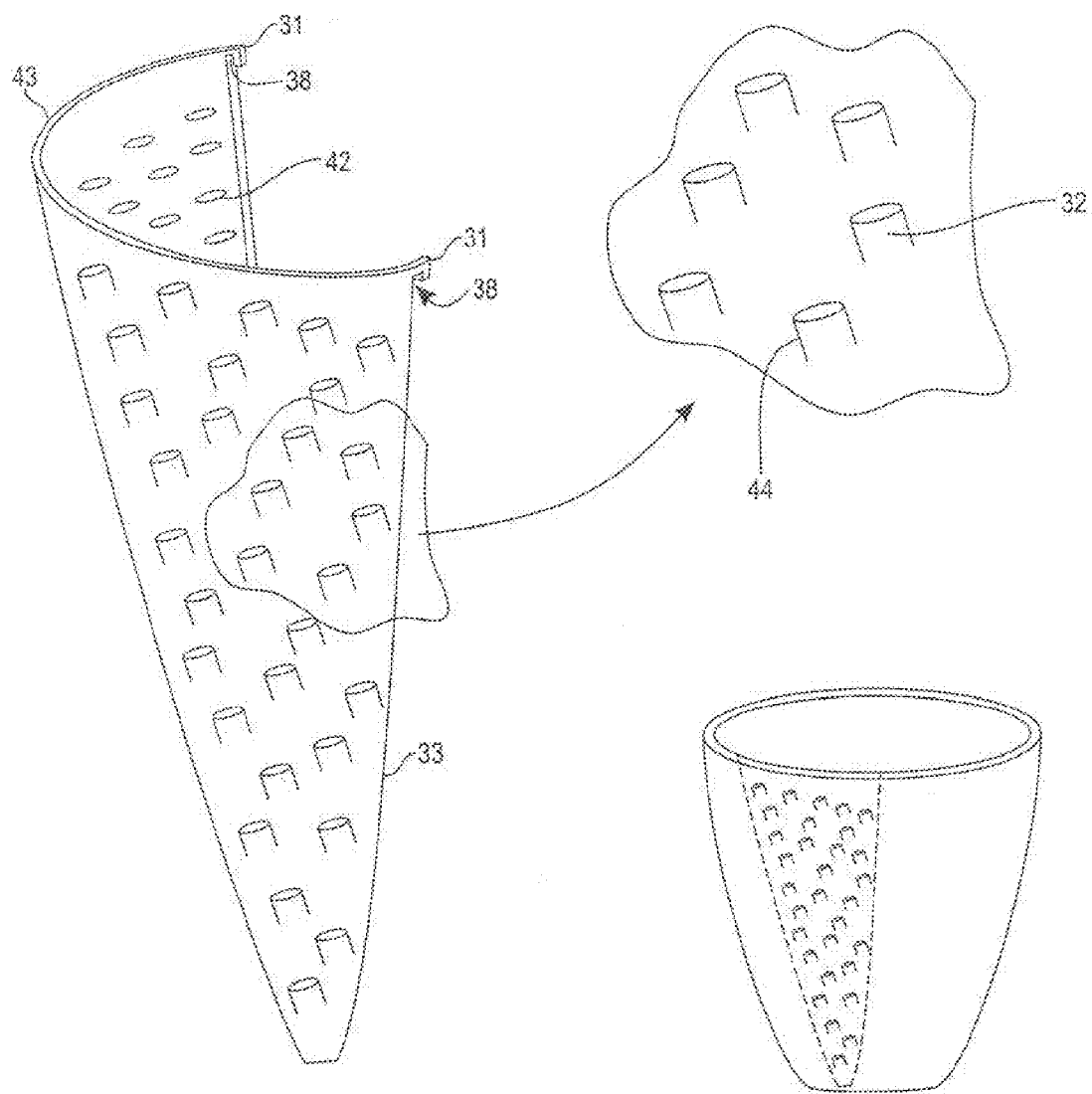
FIG. 8 is a detail view of a divider.
Figure 9:
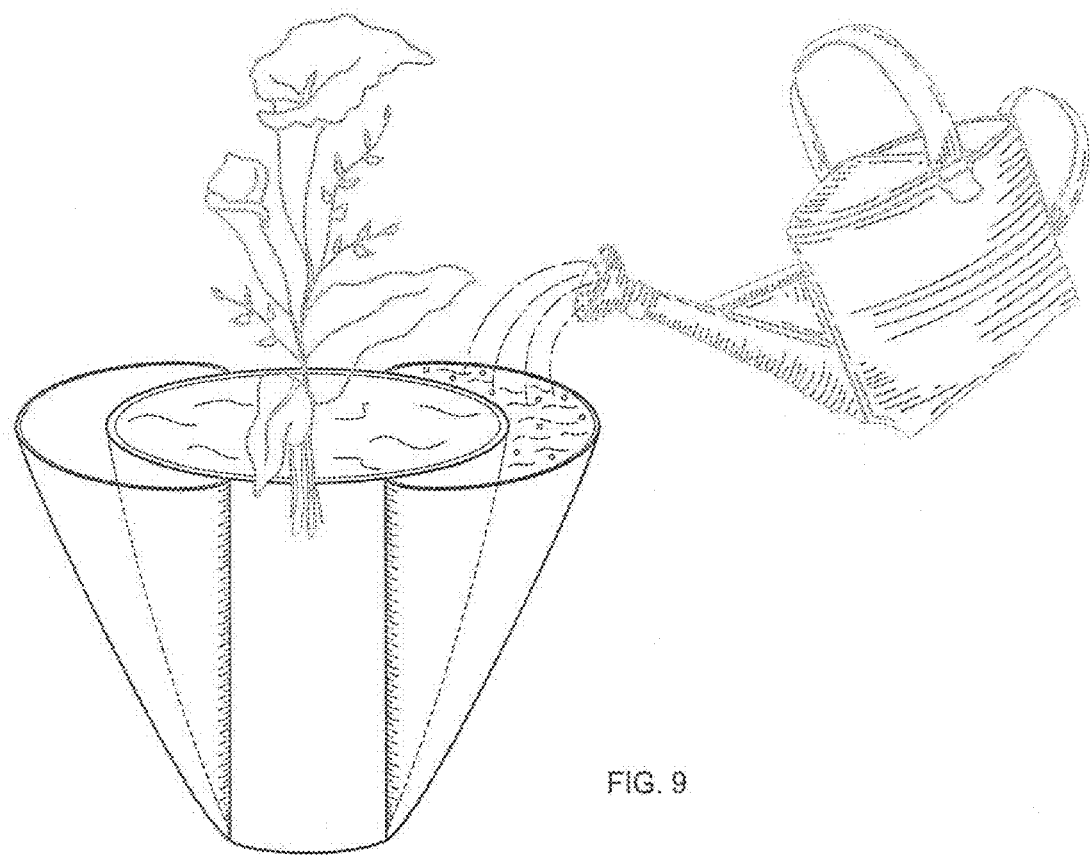
FIG. 9 is an environmental view of the present invention showing a plant planted into the pot being watered.
Figure 10:
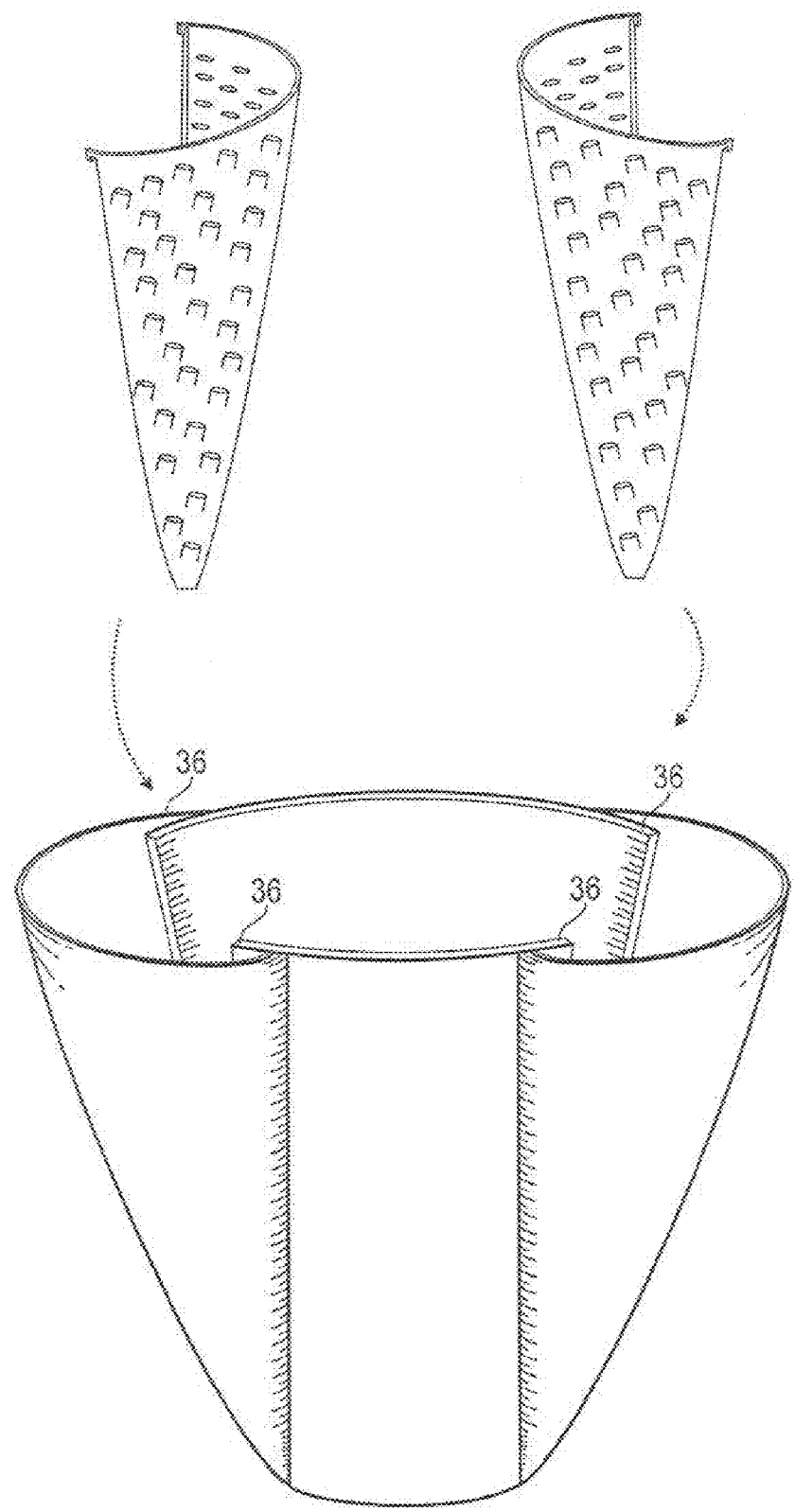
FIG. 10 shows reverse insertion of divider sheets.

A variety of details shown in FIGS. 6-9 provide a more detailed disclosure of the present invention. The central member and wings can be made of ceramic or plastic. Ceramic is the preferred material for the central member. The central member can be made as a unitary piece with a number of small openings as seen in FIG. 6. The small openings can be perforated and formed into the ceramic material before firing. After firing, the small openings allow water to pass between the central member and the wing members. A user plants a plant in the central member and waters by the peripheral wing members. The wing members have openings to allow water to flow to the central member. Excess water flows away from the central member into the wing members and the excess water can then be dumped or retained for long-term soaking of the root. The unitary piece construction provides for a single piece of ceramic or plastic to form the central member and the side wing members.

Alternatively, the area between the wings can be formed as removable divider members. Dividers 35 preferably have a plurality of tubes 32 that extend from a face of the divider. The divider 35 may include a pair of hooks 31. For attaching to free tips 36 formed on the main portion of the flowerpot.

The main central portion of the flower pot can be asymmetrical having a longer wall or a long wall 54 compared to a short wall 52 on an opposite side of the long wall 54. The asymmetric configuration may also have free tips 36 extending from a continuous portion of the long wall 54 and from the short wall 52. The free tips extend into a portion of the wings to provide a notch 38, more specifically a crescent shaped notch for retaining a flexible plastic or metal divider. The divider is preferably removably insertable into the container. They divider is also reversible to allow the tubes to extend inward into the central portion or outward away from the central portion. The divider preferably bends in reverse direction to allow insertion in reverse orientation. The divider can also be attached to an inside surface of the central portion, instead of to an outside surface of the central portion.

The divider 35 preferably has a pair of arc shaped divider edges 33. An upper edge of the divider, or a divider upper edge 43 can follow a low profile that is lower than the profile of the central portion or a high-profile that is equal to or above the profile of the central portion. The divider upper edge coincides with the wing side rim 24.

The divider preferably further includes a multitude of small tubes 32 extending from a face of the divider and extending at an angle away from a normal surface of the divider. The tubes have a tube wall 44 that can be punched or drawn from a flat sheet of metal forming the divider 35. The tube wall 44 extends from the flat portion of the divider. The tube also has a small opening for allowing water to pass through. The small water openings preferably maintain roots within the central portion of the present invention. From the inside surface of the divider 35 a number of divider openings 42 can be seen. The divider openings 42 lead to the tubes 32 which allow water flow.

Being flexible, the divider members can be inserted in reverse configuration so that the divider members have an inward curve profile instead of an outward curve profile that follows the curvature of the main central portion. When the divider members are placed in reverse configuration, the tubes extend inward into the main planting area of the main central portion. The dividers attach at a divider attachment area between the wing and main central portion.

The water openings are preferably less than 1 mm to allow water to pass through. The divider members are formed as thin flexible sheets and if metal, preferably formed from a die cut press that simultaneously presses indentations formed as water openings on a face of the divider member.

The foregoing describes the preferred embodiments of the invention. Modifications may be made without departing from the spirit and scope of the invention as set forth in the following claims. The present invention is not limited to the embodiments described above, but encompasses any and all embodiments within the scope of the following claims.

The invention claimed is:
1. A plant pot comprising:
   a. a main central portion having an opening providing access to a main planting area, wherein the main central portion is bowl shaped;
   b. a pair of wings extending from the main central portion, namely a left wing and a right wing;
   c. a pair of dividers, namely a left divider and a right divider, wherein the pair of dividers are inserted between the pair of wings and the main central portion, wherein the pair of dividers are formed as sheets, wherein the pair of dividers are removable from a divider attachment area;

d. a plurality of water openings disposed on the pair of dividers, wherein the plurality of water openings allow water to pass between the main central portion and the pair of wings;
e. a wing upper joint formed at a junction between one of the pair of wings and the main central portion, wherein the main central portion is formed with a main wall that meets a wing wall at an angle;
f. a wing lower joint also formed at a junction between one of the pair of wings and the main central portion, wherein a wing lower joint joining extends from a lower portion of the main central portion to the wing upper joint at an upper portion of the main central portion;
g. a pair of wingtips, wherein each wingtip is formed on each of the pair of wings extending from the main central portion;
h. a plurality of small tubes, wherein each of the plurality of small tubes terminates at one of the plurality of water openings; and
i. a plurality of tube walls formed on the plurality of small tubes, wherein the plurality of small tubes extend at an angle from the pair of dividers, wherein the plurality of small tubes have a plurality of tube walls.

2. The plant pot of claim 1, further comprising:
a. a wing side rim formed on each of the pair of wings; and
b. a bowl rim having about the same height as the wing side rim.

3. The plant pot of claim 1, further comprising:
a. a wing side rim formed on each of the pair of wings; and
b. a bowl rim have a higher height than the wing side rim.

4. The plant pot of claim 1, further comprising:
a. a pair of hooks formed on the left divider or on the right divider.

5. The plant pot of claim 1, further comprising:
a. a first pair of free tips formed at the left wing; and
b. a second pair of free tips formed at the right wing.

6. The plant pot of claim 1, further comprising:
a. a first pair of notches formed on the left divider; and
b. a second pair of notches formed on the right divider, wherein the first pair of notches and the second pair of notches removably connect to the main central portion; wherein the first pair of notches formed on the left divider are formed at a divider upper edge, and wherein the second pair of notches formed on the right divider are formed at the divider upper edge.

7. A plant pot comprising:
a. a main central portion having an opening providing access to a main planting area;
b. a pair of wings extending from the main central portion, namely a left wing and a right wing;
c. a pair of dividers, namely a left divider and a right divider, wherein the pair of dividers are inserted between the pair of wings and the main central portion, wherein the pair of dividers are formed as sheets, wherein the pair of dividers are removable from a divider attachment area;
d. a plurality of water openings disposed on the pair of dividers, wherein the plurality of water openings allow water to pass between the main central portion and the pair of wings;
e. a plurality of small tubes, wherein each of the plurality of small tubes terminates at one of the plurality of water openings; and
f. a plurality of tube walls formed on the plurality of small tubes, wherein the plurality of small tubes extend at an angle from the pair of dividers, wherein the plurality of small tubes have a plurality of tube walls.

8. The plant pot of claim 7, further comprising: a wing upper joint formed at a junction between one of the pair of wings and the main central portion, wherein the main central portion is formed with a main wall that meets a wing wall at an angle.

9. The plant pot of claim 7, further comprising: a wing lower joint also formed at a junction between one of the pair of wings and the main central portion, wherein a wing lower joint joining extends from a lower portion of the main central portion to the wing upper joint at an upper portion of the main central portion; and a pair of wingtips, wherein each wingtip is formed on each of the pair of wings extending from the main central portion.

10. The plant pot of claim 7, further comprising:
a. a wing side rim formed on each of the pair of wings; and
b. a bowl rim having about the same height as the wing side rim.

11. The plant pot of claim 7, further comprising:
a. a wing side rim formed on each of the pair of wings; and
b. a bowl rim have a higher height than the wing side rim.

12. The plant pot of claim 7, further comprising:
a. a pair of hooks formed on the left divider or on the right divider.

13. The plant pot of claim 7, further comprising:
a. a first pair of free tips formed at the left wing; and
b. a second pair of free tips formed at the right wing.

14. The plant pot of claim 7, further comprising:
a. a first pair of notches formed on the left divider; and
b. a second pair of notches formed on the right divider, wherein the first pair of notches and the second pair of notches removably connect to the main central portion; wherein the first pair of notches formed on the left divider are formed at a divider upper edge, and wherein the second pair of notches formed on the right divider are formed at the divider upper edge.

* * * * *